United States Patent [19]

Bockris et al.

[11] Patent Number: 4,497,698
[45] Date of Patent: Feb. 5, 1985

[54] LANTHANUM NICKELATE PEROVSKITE-TYPE OXIDE FOR THE ANODIC OXYGEN EVOLUTION CATALYST

[75] Inventors: John O'M. Bockris, College Station, Tex.; Takaaki Ottagawa, Westmont, Ill.

[73] Assignee: Texas A&M University, College Station, Tex.

[21] Appl. No.: 521,973

[22] Filed: Aug. 11, 1983

[51] Int. Cl.³ ................................................ C05B 1/02
[52] U.S. Cl. .................................... 204/129; 204/242; 204/292
[58] Field of Search ............... 204/290 R, 290 F, 291, 204/292, 129, 242

[56] References Cited

U.S. PATENT DOCUMENTS 4,076,611  2/1978  Gray ................................. 204/290 F
4,276,202  6/1981  Schmidberger ................. 204/290 F

OTHER PUBLICATIONS

Wold et al., J. Am. Chem. Soc., 79, 4911 (1957).

Primary Examiner—John F. Niebling
Attorney, Agent, or Firm—Vinson & Elkins

[57] ABSTRACT

An improved Perovskite-type oxide for electrocatalytic oxygen evolution from alkaline electrolyte comprising lanthanum nickelate is disclosed, together with an improved co-precipitation process for producing the lanthanum nickelate powders from which the anode is formed.

4 Claims, 3 Drawing Figures

LANTHANUM NICKELATE PEROVSKITE-TYPE OXIDE FOR THE ANODIC OXYGEN EVOLUTION CATALYST

BACKGROUND OF THE INVENTION

The present invention relates to the efficient production of oxygen from the electrolysis of water, and particularly to an improved catalytic anode for electrochemical oxygen evolution from alkaline water, and the method of making the same.

An electrochemical cell is a device which has as basic components at least one anode and one cathode and an electrolyte. The cell may use electrical energy to achieve a chemical reaction, such as the oxidation or reduction of a chemical compound as in an electrolytic cell. Alternatively, it can convert inherent chemical energy in a conventional fuel into low voltage direct current electrical energy as in a fuel cell. The activity of such an electrochemical device is usually expressed in terms of exchange current density or overpotential. The exchange current density ($i_o$) is the current density of the reversible potential (e.g., 0.4 V vs. NHE at 25° C. in 1M NaOH for oxygen reaction) and the overpotential measures how much the potential has departed from the reversible value to drive a reaction of a given current density.

Since the reaction rate in an electrochemical device is given by a current density, high electrocatalytic activity is associated with a high value of current density and a low value of overpotential. If the electrodes in such a cell are of common electrode material, such as e.g. iron or nickel, they tend to have low activity. The activity can be improved by coating such electrodes with precious metal electrocatalysts, such as e.g. platinum, iridium or ruthenium. The level of precious metal required for high activity and stability generally leads to high costs.

The above problems are particularly acute in electrochemical cells used, for example, for the electrolysis of water to produce hydrogen and oxygen. Hydrogen is a versatile raw material. It is, for example, a most desirable source of fuel and energy due to the clean and non-toxic nature of its combustion products. In addition, it is used, for example, in the fertilizer, metallurgical and petrochemical industries. While demand for hydrogen is increasing, production costs from conventional sources are also increasing. Water is a natural resource which is readily and abundantly available, and from which hydrogen and oxygen can be produced by electrolysis. However, the cost of the electrocatalysts hitherto available has detracted from the commercial viability of water electrolysis technology.

Similarly, the oxygen produced by water electrolysis has wide utility as a chemical feedstock. If produced very cheaply or, as an essentially free by-product of hydrogen production, oxygen could also be used as a high-temperature combustion promoter which could make usable as fuels a wide range of poorly combustible materials.

The rapid increase in costs of conventional fuels, particularly hydrocarbons, in recent years, as well as increasing concern over the environmental effect of utilizing hydrocarbon fuels, has prompted increased research and development efforts in the area of improving catalysts, methods and apparata for electrochemical water splitting to produce pure hydrogen and oxygen. Most current water electrolyzers utilize an approximately 25–30% alkaline water solution as the electrolyte. The principal cause of loss of efficiency in such alkaline water electrolysis is the irreversibility of the oxygen evolution reaction on the metals and alloys used as anodic materials, including specifically the growth of poorly conducting oxide films on the anodes.

Among the more commonly used anode materials for such cells are nickel and platinum. Nickel, while reasonable in terms of cost, shows both a low current density, with resultant poor oxygen evolution activity, and a tendency to form insulating oxide films. Platinum, used pure as an anode material, or as a catalytic coating on nickel or other metal or alloy anodes, increases current density and oxygen evolution activity of the cell, but at very substantially increased costs, which make the process economically unattractive.

One of the most active anode materials presently known for alkaline water electrolysis is the spinel-type material, $NiCo_2O_4$, which has a reported activity many times higher than platinum. Nevertheless, such material has not proved attractive for large scale use because some of the oxides on the surface tend to drop off on prolonged testing at high current densities. For discussions of spinel-type $NiCo_2O_4$ as an anode material see, for example, A. C. C. Tseung and S. Jasem, *Electrochem. Acta.*, 22, 31 (1977); A. C. C. Tseung, S. Jasem, and M. N. Mahmood, *Hydrogen Energy System* [T. V. Vegiroglu and W. Seifritz, Editors, Vol. 1, p. 215, Pergamon, Oxford (1978)]; and S. Trasatti and G. Lodi, Electrodes of Conductive Metallic Oxides, [S. Trasatti, Editor, p. 521, Elsevier, N.Y. (1981)].

It is accordingly the principal object of the present invention to provide an improved anode material for oxygen production by electrolysis.

A further object is to provide an anode material which exhibits improved catalytic activity for oxygen evolution in alkaline water electrolysis, and improved stability as compared to prior art electrodes.

Another object is to provide an improved process for the manufacture of such material and for the production of electrodes from such material.

SUMMARY OF THE INVENTION

Figure 1:
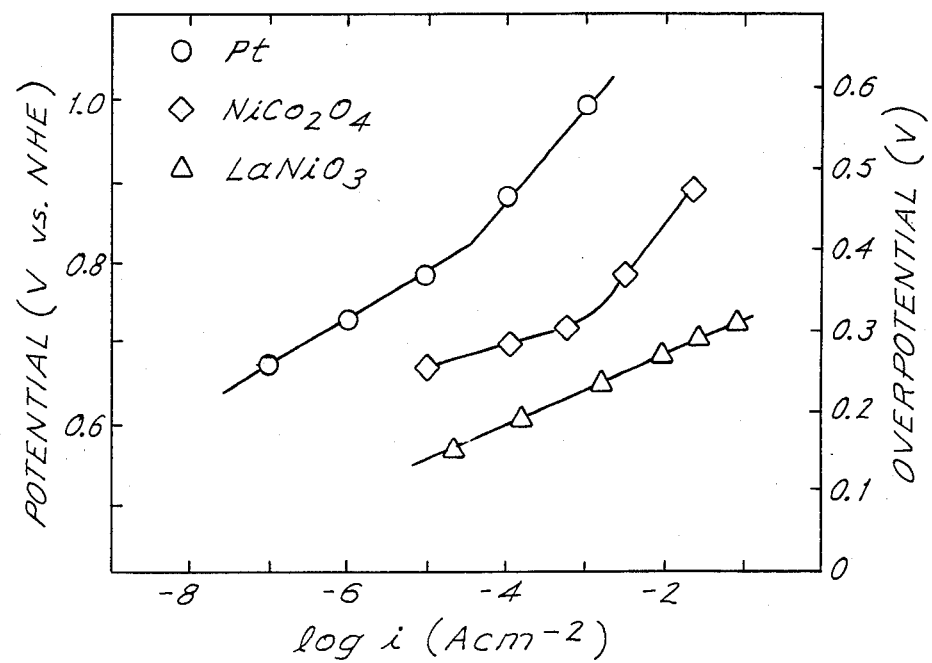
FIG. 1 displays graphically a comparison of catalytic activities for oxygen evolution on lanthanum nickelate, $NiCo_2O_4$ and platinum in approximately one molar alkaline electrolyte at 25° C.

In accordance with the present invention, it has been discovered that the Perovskite-type oxide, lanthanum nickelate, $LaNiO_3$, exhibits markedly improved activity for electrolytic oxygen evolution from alkaline water, as compared to the best anode materials previously known. It has further been discovered that lanthanum nickelate is stable in alkaline electrolytes in the potential region for oxygen evolution, and does not exhibit the growth of insulating oxides during electrolytic activity.

In the preferred embodiment, the lanthanum nickelate anode material is synthesized by a novel co-precipitation technique described more fully below.

DETAILED DESCRIPTION OF THE INVENTION

In preparation of the anodes in accordance with the present invention, pure lanthanum nickelate crystals are preferably synthesized by a co-precipitation technique. The starting materials are essentially pure lanthanum nitrate hexahydrate [La(NO$_3$)$_3$.6H$_2$O] and nickel nitrate hexahydrate [Ni(NO$_3$)$_2$.6H$_2$O]. Stoichiometric amounts of each nitrate are weighed and dissolved in distilled water. Precipitates are produced by adding 1 molar NaOH with the pH being adjusted to about 11.

For example, 5.77 g of [Ni(NO$_3$)$_2$.6H$_2$O] and 8.53 g of [La(NO$_3$)$_3$.6H$_2$O] are dissolved in 200 ml of H$_2$O and 90 ml of 1N NaOH are added to adjust the pH to 11 to produce the hydroxide precipitates. The resulting precipitates produced are promptly washed and centrifuged, preferably repeatedly, to remove sodium ions and soluble salts. The obtained precipitates, which contain a mixture of hydroxides of La and Ni, are then oven dried for several hours at about 100° C., following which they are heated in a furnace at 800° C. for 16 hours in an O$_2$ atmosphere to form LaNiO$_3$ by the reaction: La(OH)$_3$+Ni(OH)$_2$+XO$_2$→LaNiO$_3$+yH$_2$O.

The last heating step results in the formation of a Perovskite crystalline structure for the produced powder, which may be confirmed utilizing known X-ray defraction procedures.

Alternative prior art techniques may also be utilized to produce the pure lanthanum nickelate Perovskite-type powder. Such prior art techniques, for example, include starting with stoichiometric amounts of the lanthanum and nickel oxides and following the procedure shown by A. Wold, B. Post and E. Banks, *J. Amer. Chem.. Soc.* 79,4911 (1957). We believe, however, that the disclosed co-precipitation technique utilizes more uniform mixtures of starting materials and results in better crystallinity and larger crystalline surface areas.

Electrodes may be produced from the Perovskite-type lanthanum nickelate powder, and employed as anodes in water electrolysis for anodic oxygen production, utilizing apparatus and procedures well known to those skilled in the art. See, for example, the procedures discussed by J. O'M Brockris and A. K. N. Reddy in *Modern Electrochemistry*, Vol. 2, Chapter 8, [Plenum, N.Y. (1970)].

In the preferred embodiment, electrodes are made by pressing the powders into 13 mm diameter pellets at a pressure of 300 kg/cm$^2$. A Beckman model K-13 die may be utilized. The pressed pellets are then sintered at 1000° C. for 48 hours in an oxygen atmosphere. Shorter sintering times may be used if desired, but preferably not less than 16 hours total. This sintering process results in much improved mechanical strength for the electrode compared, for example, with the Teflon-bonded NiCo$_2$O$_4$ electrode disclosed by A. C. C. Tseung, S. Jaspen and M. N. Mahood in *Hydrogen Energy Systems*, [T. V. Vegiroglu and W. Seifritz, Editors, Vol. 1, p. 215, Pergamon, Oxford, (1978)].

EXAMPLE 1

Figure 2:
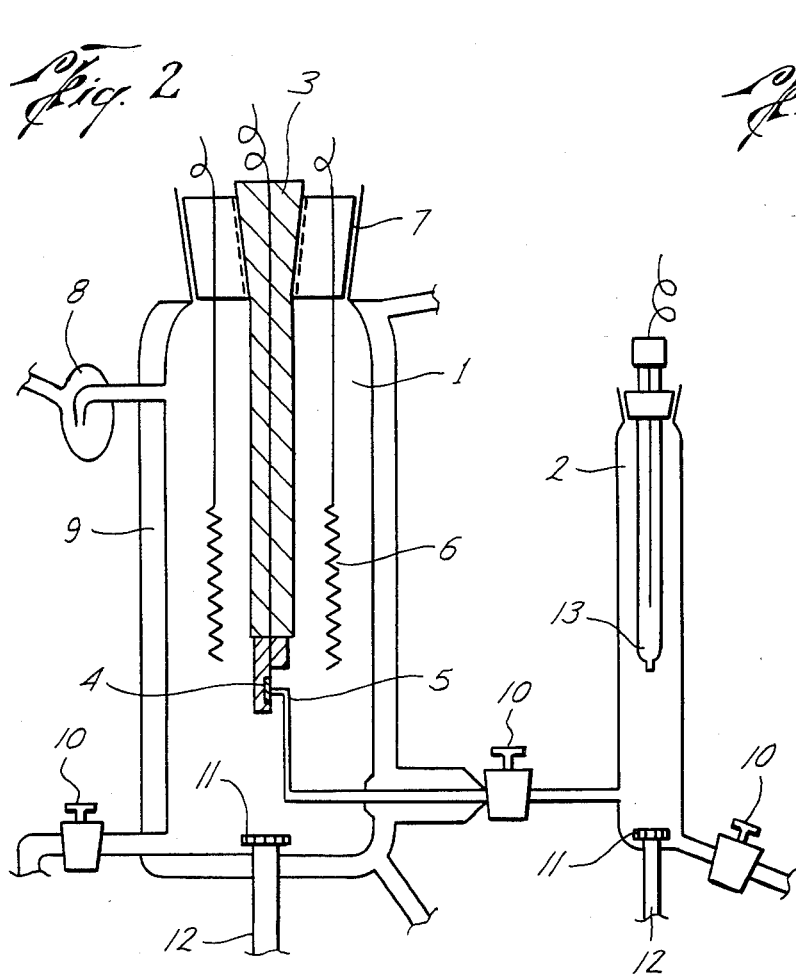
FIG. 2 illustrates, in somewhat diagrammatic form, a test electrolyte cell of the type utilized to obtain the data of FIG. 1.

Referring to FIG. 2 there is shown, schematically, an electrochemical cell utilizing the lanthanum nickelate electrode according to the present invention as a working electrode. In the apparatus of FIG. 2, the numerals designate the following parts: 1, working and counter electrodes compartment ($\phi$=5 cm); 2, reference electrode compartment ($\phi$=2 cm); 3, Teflon electrode holder; 4, working electrode; 5, luggin capillary; 6, cylindrical platinum gauze counter electrode; 7, conical joint (45/50); 8, gas bubbler; 9, water jacket; 10, Teflon stopcock; 11, glass frit (medium); 12, gas inlet; and 13, reference electrode (SCE).

In the test apparatus of FIG. 2, a simple two-compartment glass cell was used. In a double-walled main compartment, a working electrode 4 was placed below a cylindrical platinum gauze counter electrode 6 ($\phi$=3.5 cm, height =5 cm) in order to minimize the iR effect and any reaction with gas evolving from the counter electrode. A saturated calomel electrode 13 (Calomel Electrode with Ceramic Junction, Beckman #93-003-94-02) was used as the reference electrode. All stopcocks were made of Teflon to avoid the use of grease. The temperature of the main compartment was controlled by a constant temperature circulator (HAAKE model FK).

All experiments, except for the study of temperature dependence, were made at 25° C. All electrode potentials were measured in reference to the saturated calomel electrode (SCE) and converted to a scale of the normal hydrogen electrode (NHE).

Figure 3:
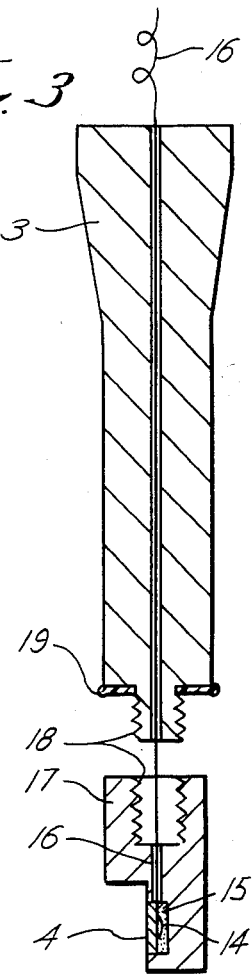
FIG. 3 illustrates in enlarged detail the Teflon electrode holder of FIG. 2.

In FIG. 3 is shown in greater detail the Teflon holder 3 for the working electrode 4 of lanthanum nickelate. In FIG. 3, the numerals designate the following parts: 14, ohmic contact (silver epoxy resin); 15, epoxy resin; 16, copper wire; 17, Teflon cap; 18 screw thread; and 19, O-ring.

An electronic ohmic contact was made to one side of an electrode pellet 4 by means of a conducting silver epoxy resin 14, (E-SOLDER adhesives, ACME Chemicals and Insulation Co., cat. #3021) with a copper lead 16 embedded in the resin. The back side of the electrode pellet 4 including the silver-epoxy/electrode/wire contacts was covered with an epoxy resin 15 (EL-MER'S, Borden, Inc.) to secure the ohmic contact from chemical attack. The pellet was then fixed into a teflon cap with an epoxy resin. The cap was screwed into Teflon 3 holder which fitted into the electrochemical cell depicted in FIG. 2.

The use of Teflon holders meant that the area of epoxy resin exposed to the electrolyte was minimal (negligible). The geometric electrode area used was 1.33 cm$^2$ (13 mm diameter).

Steady state polarization characteristics for oxygen evolution and/or reduction on various Perovskite-type oxides were determined using a PAR model 173 potentiostat with a PAR model 376 current/voltage converter module. The output potential and current were measured using two HP3466A digital multimeters. The output current was also monitored on an X-t recorder (Fisher Recordall series 5000) to ensure a steady state. The time required to reach a steady state was usually within two minutes (100 seconds), while 5–10 minutes were necessary near the reversible potential (low overpotential region). Before each measurement, the working electrode was held at the open-circuit condition under a stream of O$_2$ for at least one hour. The electrode potential was then changed in steps of 20 mv in the direction of decrease in overpotential, in an O$_2$-saturated (under a stream of O$_2$) 1M NaOH solution, for both oxygen evolution and reduction. The sum of the solution resistance and electrode resistances was determined from the impedance measurements, and iR-free data were obtained by subtracting the ohmic drop from the measured potential value.

The data obtained utilizing this test apparatus by utilizing as the working electrode (1) Pt, (2) $NiCo_2O_4$ and (3) $LaNiO_3$ according to the present invention, are displayed graphically in FIG. 1. As can be seen, the lanthanum nickelate electrode according to the present invention produces a current density of 100 mA per square centimeter, at an overpotential of 300 mV in 1M sodium hydroxide at approximately 25° C. In comparison to platinum and Spinel-type $NiCo_2O_4$ electrodes under the same conditions, this is approximately $10^5$ times greater current density than platinum and approximately 150 times greater current density than Spinel-type $NiCo_2O_4$, which has heretofore been reported as one of the best electrocatalysts for oxygen evolution. The result, as shown in FIG. 1, is that the reaction, and $O_2$ production, proceeds many times faster on the $LaNiO_3$ electrode of the invention than on the best known prior art electrodes and electrocatalysts.

Moreover, the lanthanum nickelate anodes according to the present invention have shown marked stability in alkaline electrolytes. Measurements at an overpotential of 300 mV were taken for 75 hours, during which the current density remained constant, at approximately 100 $mA/cm^2$.

The advantages of the use of lanthanum nickelate for oxygen evolution anodes, in addition to its excellent catalytic activity and stability, are its very low cost, being only approximately 1% of platinum electrodes and about 30% the cost of nickel or $NiCo_2O_4$ Spinel-type oxides.

The foregoing disclosure and description of the invention are illustrative only, and various changes may be made in the details thereof without departing from the spirit of the invention, which is measured by the scope of the appended claims.

What is claimed is:

1. An electrochemical cell for producing oxygen and hydrogen by the electrolysis of water, said cell comprising:
   a container;
   an aqueous electrolyte in said container;
   a cathode mounted in said container in contact with said electrolyte;
   a lanthanum nickelate anode mounted in said container in contact with said electrolyte; and
   means for electrically interconnecting said cathode and said anode,
   whereby when an electrical potential is exerted between said cathode and said anode, gaseous hydrogen will be evolved at said cathode and gaseous oxygen will be evolved at said anode.

2. The apparatus according to claim 1 wherein said aqueous electrolyte is alkaline.

3. A process for the production of gaseous hydrogen and gaseous oxygen by the electrolysis of water, said process comprising:
   contacting an aqueous electrolyte with a cathode and with an anode comprising lanthanum nickelate;
   exerting an electrical potential between said cathode and said lanthanum nickelate anode; and
   evolving gaseous hydrogen at said cathode and gaseous oxygen at said lanthanum nickelate anode.

4. In a cell for producing oxygen by the electrolysis of an aqueous electrolyte, the improvement comprising a lanthanum nickelate anode.

* * * * *